(12) United States Patent
Jochim et al.

(10) Patent No.: US 12,483,623 B2
(45) Date of Patent: Nov. 25, 2025

(54) REMOTE DIRECT MEMORY ACCESS FOR REAL-TIME CONTROL APPLICATIONS

(71) Applicant: GM GLOBAL TECHNOLOGY OPERATIONS LLC, Detroit, MI (US)

(72) Inventors: Markus Jochim, Troy, MI (US); Khaja Shazzad, Windsor (CA); Sudhakaran Maydiga, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 58 days.

(21) Appl. No.: 18/589,307

(22) Filed: Feb. 27, 2024

(65) Prior Publication Data

US 2025/0274512 A1    Aug. 28, 2025

(51) Int. Cl.
*G06F 15/16*    (2006.01)
*H04L 47/22*    (2022.01)
*H04L 67/1097*  (2022.01)

(52) U.S. Cl.
CPC .......... *H04L 67/1097* (2013.01); *H04L 47/22* (2013.01)

(58) Field of Classification Search
CPC ............................ H04L 47/22; H04L 67/1097
USPC ......................................................... 709/203
See application file for complete search history.

(56) References Cited

U.S. PATENT DOCUMENTS

| | | | |
|---|---|---|---|
| 7,912,641 B2* | 3/2011 | Osentoski | G08G 1/205 455/345 |
| 10,678,243 B2* | 6/2020 | Luo | G05D 1/027 |
| 11,038,802 B2* | 6/2021 | Yamasaki | H04L 47/54 |
| 11,107,097 B2* | 8/2021 | Kawashima | G07C 5/008 |
| 11,156,462 B2* | 10/2021 | Zhang | G01C 21/3679 |
| 11,238,160 B2* | 2/2022 | Kallenberg | G06F 21/572 |
| 11,499,830 B2* | 11/2022 | Zhang | B60Q 9/00 |
| 11,505,114 B2* | 11/2022 | Takori | F21S 43/14 |
| 2007/0294033 A1* | 12/2007 | Osentoski | G08G 1/205 701/29.3 |
| 2013/0268165 A1* | 10/2013 | Hashima | B60W 10/30 701/50 |
| 2019/0089636 A1* | 3/2019 | Yamasaki | H04L 47/805 |
| 2020/0378765 A1* | 12/2020 | Zhang | G07C 5/008 |
| 2020/0394668 A1* | 12/2020 | Zhang | G06Q 30/0205 |
| 2021/0065224 A1* | 3/2021 | Kawashima | B60W 40/12 |
| 2021/0293545 A1* | 9/2021 | Zhang | G07C 5/085 |
| 2021/0300235 A1* | 9/2021 | Takori | F21S 43/14 |
| 2021/0335060 A1* | 10/2021 | Bauer | G07C 5/0816 |
| 2023/0096468 A1 | 3/2023 | Ong et al. | |

* cited by examiner

*Primary Examiner* — Moustafa M Meky
(74) *Attorney, Agent, or Firm* — Quinn IP Law

(57) ABSTRACT

In an aspect, systems and methods of connected nodes, including electronic control units (ECUs) in a vehicle, integrate remote direct memory access (RDMA) capabilities with time-sensitive networking (TSN) traffic shaper configurations in a manner that guarantees lossless, bounded-latency critical traffic (CT) streams, while also allowing for different classes of traffic to flow through the connected nodes. In another aspect, mechanisms are introduced to enable an automotive software framework (e.g., classic AUTOSAR) to support RDMA communications.

20 Claims, 5 Drawing Sheets

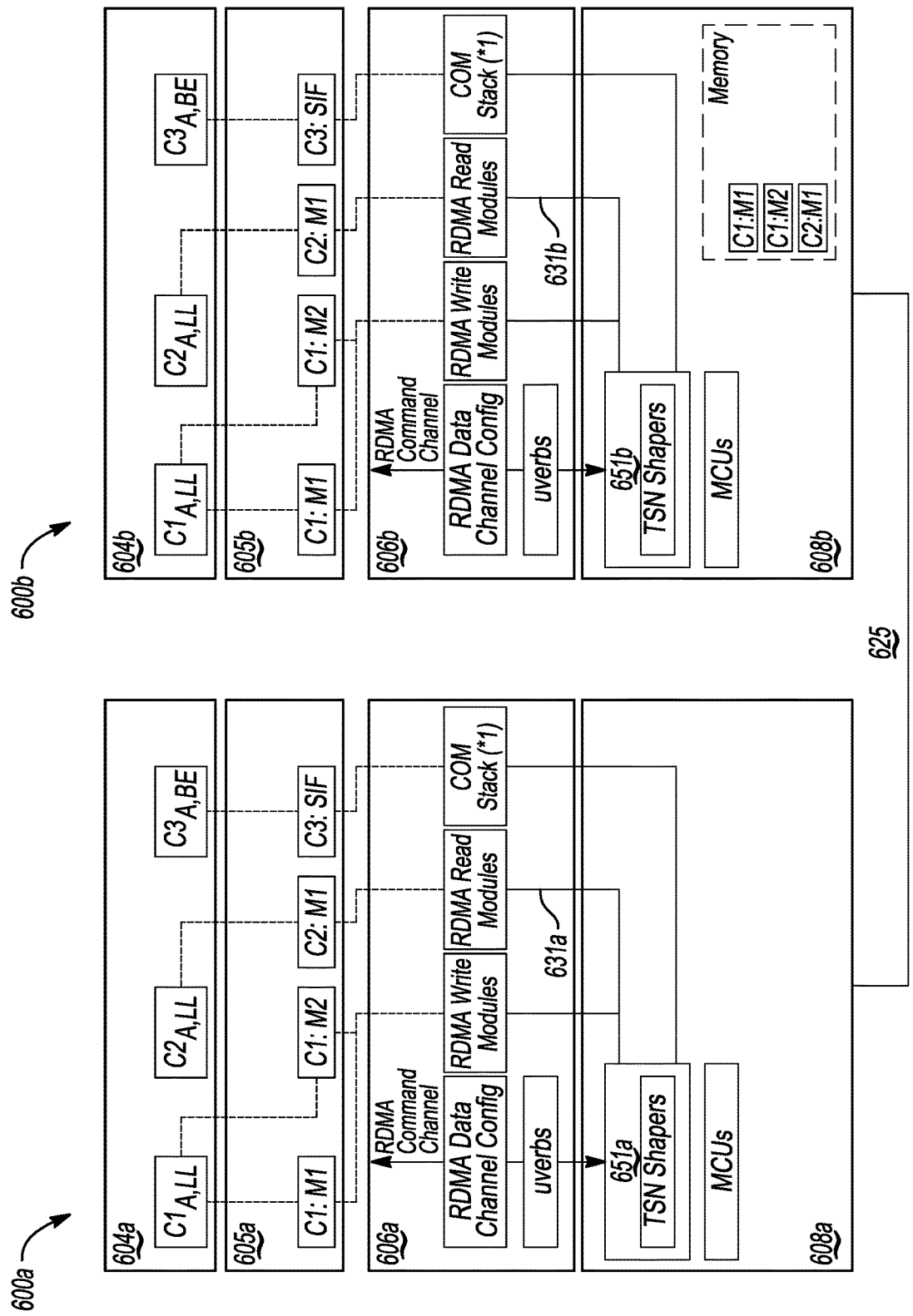

REMOTE DIRECT MEMORY ACCESS FOR REAL-TIME CONTROL APPLICATIONS

INTRODUCTION

As early as a decade ago, the cumulative amount of data being processed in different commercial applications was markedly less than the present day. In light of the recent growing number of electronic controllers and processing architectures, and the sheer number of applications that rely on such devices, the amount of data that needs to be processed and requires CPU time to do so today has dramatically increased. Examples may include motor vehicles and other forms of transport, which have become increasingly reliant on software (e.g., electronic braking, real-time suspension adjustment, autonomous driving, etc.). Both the increased number of applications and the substantial amounts of data tend to consume significant processing resources. The problem is particularly apparent when considering the average number of reads and writes that may occur in even a moderate collection of connected nodes, such as ECUs in a vehicle, for example. These memory fetches consume processing cycles and increase latencies.

Remote Direct Memory Access (RDMA) is a standardized computing architecture that enables read and write access to the memory of a remote machine without interrupting the processing activities of the central processing unit (CPU) or other processing device on that machine. RDMA reduces processor load and communication latency. RDMA was primarily developed for use in Data Centers using Converged Ethernet standards, and as such, is not suitable for other non-centralized applications where ultra-low latencies are needed.

SUMMARY

The principles of this disclosure enable the use of RDMA for ultra-low latency control applications within vehicle networks and autonomous software frameworks in which critical traffic (CT) is guaranteed to include lossless transmission/reception of frames at a bounded latency. The principles of the disclosure further disclose use of the ATS traffic shaper to enable specific methods for calculating the configuration parameters in a manner that ensures bounded latency in a set of lossless transmissions across an applicable set of transmission paths, as described further below. The principles of the disclosure, still further, extend to subsuming all CT frames arriving via egress ports of a queue at a destination via a set of transmission paths as a single Frame of a determined size (e.g., bits), which simplifies the calculation of a value (Committed Information Rate) to ensure that all CT frames are properly sent to the arriving node within each respective interval, without delay.

Accordingly, in one aspect of the disclosure, a vehicle includes a frame including a body, the body and frame defining a cabin and areas for placement of functional vehicle components, and a network of electronic control units (ECUs) in the areas and selectively coupled together via conducting elements, at least some of the conducting elements including respective switches for controlling data flow between identified ECUs of the plurality, wherein the ECUs comprise respective network interface cards (NICs) having remote direct memory access (RDMA) capabilities for initiating or receiving data writes and reads, the NICs being further configured to execute traffic shapers to ensure that specified critical transmissions (CT) comprise lossless RDMA data exchanges characterized by bounded latencies.

In various embodiments, the vehicles are configured to perform RDMA memory retrievals and writes using a plurality of classes of data. The plurality of classes of data may include CT and best effort (BE) data traffic. The NICs may further include ingress and egress ports, the ingress and egress ports having ingress and egress queues for each of the plurality of classes of data. The NICs may include at least one egress port, the egress port having egress queues for transmitting the CT and BE traffic. Respective switches may also ingress and egress ports, with each of the egress ports having egress queues. For at least one transmission path of the network, the traffic shapers include asynchronous traffic shapers (ATSs). A processing system may be operable to configure the egress queues of the corresponding NICs and the at least one switch in the transmission path through which the CT traffic flows to be managed by the ATSs. The processing system may be operable to configure the egress queues through which the BE traffic flows in the transmission path as strict priority without traffic shaping. The processing system may be operable to calculate, for each egress queue in the transmission path, a committed information rate (CIR) and a committed burst size (CBS), and to use the CIR and CBS to ensure the lossless RDMA data exchanges and the bounded latency for the transmission path. The processing system may further be operable to configure the egress queues in the egress ports of the NICs for all transmission paths of the network in which the CT traffic flows. At least a portion of all transmission paths of the network may include RDMA transfers.

In another aspect of the disclosure, a system includes a network of nodes, the nodes having respective network interface cards (NICs), at least some of the nodes being configured with remote direct memory access (RDMA). Each NIC has an egress port, with each egress port having a plurality of egress queues. Each egress queue corresponds to a class of traffic. The system further includes a processing system to identify each of the RDMA transmission paths which includes a periodic flow of critical traffic (CT) across intervals. For each RDMA transmission path, the processing system is operable to identify all nodes from or through which the CT is transmitted. For each egress port, the processing system is operable to configure queues carrying the CT to be traffic-shaped to guarantee a lossless bounded latency for each successive interval, and to calculate the committed information rate (CIR) and committed burst rate (CBR) of an egress port of a sink node in the transmission path to ensure a lossless, bounded-latency RDMA CT transmission at the sink node.

In various embodiments, the processing system may further be operable to configure, for each egress port, other egress queues carrying lower priority data streams using priority with or without using traffic-shaping. The processing system may further be configured to calculate the worst case latencies (WCLs) to determine the bounded latencies of each frame of CT. The network may further include switches having egress ports, each of the egress ports having egress queues. The processing system, by executing code during the design of the system, may be configured to determine the worst case latency (WCL) for a periodic frame of the CT transmitted along all applicable transmission paths to the sink node based on a switch delay, a transmission size, a number of transmissions per interval, a long frame transmission time, and a maximum size frame of non-CT traffic preceding the frame of the CT, and to identify the bounded WCL for the CT in each of the transmission paths. The network may include transmission of best effort (BE) traffic.

The NICs may include at least one egress port, the egress port having at least two egress queues for transmitting the CT and BE traffic.

In still another aspect of the disclosure, a system for enabling an automotive software framework to support remote direct memory access (RDMA) communication includes a plurality of networked electronic control units (ECUs), each ECU including an application layer including a plurality of control algorithms, a run time environment (RTE) including modules configured to act as an interface for the control algorithms, a base software (BSW) layer including an RDMA data channel configuration coupled to an application programming interface compatible with the automotive software framework, RDMA write and read modules, and a COM stack, an ECU hardware layer including a network interface card (NIC) and one or more microcontroller units (MCUs), wherein the NIC includes one or more traffic-shapers and a physical memory for storing data read or written between a first and second ECU, wherein the first ECU reads data from or writes data to the memory of a second ECU, wherein the data is stored in the physical memory of either the first or second nodes, respectively, and wherein the data is routed to the control algorithms using an RDMA data channel on the first or second ECU, the RDMA data channel coupled respectively to the RDMA write and read modules on the first or second ECUs and sent via the interface modules of the RTE to the control algorithms.

In various embodiments, the ECUs are configured to guarantee a lossless bounded latency for a critical traffic (CT) stream. The automotive software framework may include AUTOSAR. The one or more traffic-shapers may advantageously eliminate a reliance on an RDMA over Converged Internet (RoCE) protocol in the NICs of the ECUs.

The above summary is not intended to represent every embodiment or every aspect of the present disclosure. Rather, the foregoing summary merely provides examples of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes the various combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, explain the principles of the disclosure.

FIG. 6 is a set of networked nodes illustrating an RDMA operation in accordance with the present disclosure.

Figure 1A:
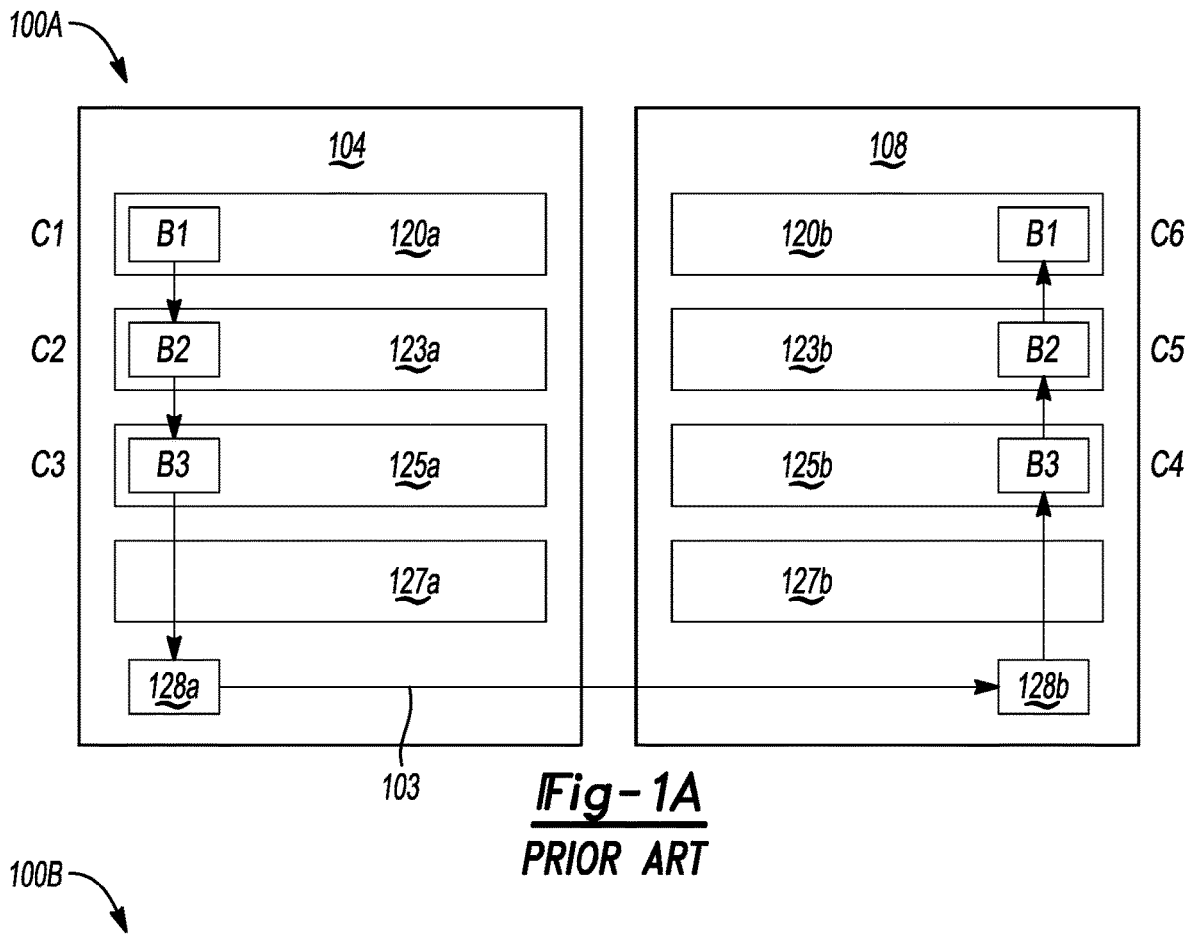
FIG. 1A is a block diagram of a server performing a memory access with another server.

The appended drawings are not necessarily to scale and may present a simplified representation of various features of the present disclosure as disclosed herein, including, for example, specific dimensions, orientations, locations, shapes and scale. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless explicitly disclaimed or readily apparent from the context, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of", or "within acceptable manufacturing tolerances", or logical combinations thereof.

While this disclosure uses the vernacular "network interface card" or "NIC," it will be appreciated that in most ECUs, expansion slots are not used. Instead, the functions are integrated onto the ECU's printed circuit board (PCB). This includes components such as microcontrollers, memory, and communication controllers (e.g., for Ethernet communication). Thus, for purposes of this disclosure, the terms "NIC" and the hardware implementing the RDMA functionality may reside either on an integrated communication controller or on a network interface card that may be connected to the main PCB of the ECU. That is to say, the terms "NIC" and "RDMA" are broadly intended to include integrated hardware technology in addition to the use of separate cards inserted in expansion slots, as in non-vehicular embodiments. This integrated processing technology is discussed further below in the context of the processing system.

The principles of the present disclosure apply to, among other types of resources, vehicle networks and the interconnected electronic control units (ECUs), referred to herein sometimes as nodes, which reside within the vehicle. Each ECU may be equipped with one or more microcontroller units (MCUs). The ECU's may be connected via wires or other conductors, which may have intervening components such as switches, resistors, diodes, transistors, capacitors, transformers, inductors, etc. The ECU may include a network interface card (NIC), the latter of which may include a transceiver for transmitting and receiving data to and from other ECUs, respectively. In some configurations, the network interface functionality is physically integrated with the ECU or with an MCU therein, whether directly or through other means. The ECU may also include one or more types of memory, such as cache memory, buffers, host memory (e.g., dynamic random access memory (DRAM), static random access memory (SRAM), read-only memory (ROM), non-volatile memory such as flash memory, magnetic hard disks and solid-state memory, among other forms of computer readable media).

One or more MCUs may be embedded within each ECU. The MCU is a vital component in that it is the portion of the processing system that provides needed computing resources to control distinct functions in a vehicle. The MCU may include one or more processing cores, microcontroller cores, and memory. The ECU may control one or more vehicle electrical or electro-mechanical systems. The core of an ECU may include one or more processors that execute instructions of embedded software or other code obtained from its memory or another memory in the vehicle. A virtual-ECU (V-ECU) is a software model of target ECU hardware that may assist in performing ECU functions and simulations, but that may be implemented purely in software, such as on the microprocessor of an ECU. V-ECUs advantageously enable vehicle functions to be tested using microcontrollers in laboratories before the functions are deployed in the vehicles to be sold, for example. Each instance of the V-ECU may be simply deployed with the test solution, after which the functionality may be thoroughly tested. For sophisticated ECUs, V-ECUs may be used as independent entities within the system to perform authorized tasks.

Further, for purposes of this disclosure, the terms "MCU" and "processor" may constitute more than one processor. The terms may refer to distinct kinds of controllers or microcontrollers for executing various tasks. In some cases, at least part of the processor may include dedicated hardware, such as in a digital signal processor (DSP). The processor may also be implemented (in part or in full) with an application specific integrated circuit (ASIC), a System on a Chip (SoC), combinational Boolean logic circuits that perform the requisite digital functions, a field-programmable gate array (FPGA) Application Specific Integrated Circuits (ASICs), or another type of programmable logic device (PLD). The transistors used in the processor may include complementary metal-oxide-semiconductor (CMOS) technology, bipolar junction transistors, Gallium-Arsenide transistors, or some combination thereof. The processor may execute middleware, and in some embodiments, it may rely at least partially on one or more application programming interfaces to communicate with other systems. The processor may also include upgradeable firmware. The memory may be logically partitioned to include a database or repository, or relational or non-relational data tables.

Initially, in this embodiment, the data that originated from one or more hardware elements (e.g., ECUs and/or the MCUs therein) may be transmitted by a processing system, and then sent via a network to data storage or another destination via egress and ingress queues on the various nodes. In the examples above, one or more of the networks 103 are shown as a simple connection for simplicity, but they may include anything from a short, high-speed network (e.g., Fast Ethernet or the like) to a simple hardware connection including one or more wires or cables. In still other embodiments, one or more ECUs or other nodes may transmit the data wirelessly. In other, more intricate deployments, the networks may be complex and configured to exchange data between the various components at high speed.

For purposes of this disclosure, the processor(s), controller(s) and/or MCU(s) may be referred to—where appropriate in the context—as a processing system. The processing system includes one or more processors, ECUs, MCUs and memory, or other types of nodes, which may also include multi-processor computers. The processing system may include one or more memories for storing data to be transmitted, data received from other ECUs or nodes, or code for execution on the processors of the processing system. The processing system may have different forms. First, in a network of two or more nodes, the processing system may include the MCUs or processors in the nodes including memory sufficient to execute the methods described herein. In some embodiments, the processing system may include a suite of different processors (e.g., MCUs) on the various nodes. In other embodiments, the processing system may include a portion of the processors of the nodes of the network that performs an identified function. In still other embodiments, the processing system may include TSN implementations residing in a controller, such as an Ethernet controller of a NIC (the latter of which, as noted, need not be a separate PCB and instead may be integrated into the ECU's PCB, or configured in another suitable way). In this example, the NIC does not reside in the MCUs within an ECU. TSN may help ensure that in a network topology, that information may travel between two points in a predictable amount of time. Traffic shaping, in turn, may include bandwidth management methods in which the flow of lower priority network packets is delayed ensuring that high priority traffic transmitted may reach its destination by a fixed or maximum time. In still other embodiments, the processing system may be deemed to include a single node where the processors and memory are used predominantly or exclusively to perform methods herein. The processing system may also constitute, in other implementations, memory for storing data and executable code, one or more dedicated integrated circuits, one or more central processing units (CPUs). one or more ASICs, one or more SoCs, one or more PLDs, one or more FPGAs, one or more MCUs, integrated or discrete combinational logic, one or more reduced instruction set computer (RISC) processors, one or more complex instruction set (CISC) processors, one or more controllers, one or more microcontrollers, one or more multi-core processors or other types of processing technology not expressly set forth herein. As noted, the processing system may be distributed in the sense that the different processors and memories on different nodes of an applicable network topology may each execute code relevant to the identified function. For example, traffic shaping and the generation of other lossless RDMA transmissions with bounded latencies may occur via an Ethernet controller integrated in the ECU's PCB. Accordingly, the processing system performing these functions includes the Ethernet controller, rather than the MCUs in the ECU. The Ethernet controller may be employed as a NIC integrated within the ECU's PCB (or in different embodiments, as a separate PCT in itself). These distributed processors, MCUs, or instead the NICs/controllers in the case of traffic shaping and message generation, may collectively be referred to a processing system, whether or not the processors execute code autonomously, partially autonomously, or independently. The processing system may include memory (e.g., various levels of cache memory, dynamic random access memory (DRAM), static random access memory (SRAM), programmable read only memory (PROM), electrically-erasable programmable read-only memory (EEPROM or EPROM), flash memory, magneto-based hard drives, solid state hard drives, and the like. The memories may include code stored therein and data. The collective structural and functional architecture of the processing system is intended to simplify the parlance and to acknowledge that the code may be executed using processors at separate locations, for example or in several diverse ways, just a few of which are described above.

The processing system may range from a single processor to a large number of identical or disparate processors. The processing system may, as noted, be embodied as a stand-alone element, such as an integrated circuit device or a plurality thereof. In non-automotive applications, the processing system may be present in one or more servers, one or more workstations, and/or one or more client devices. The processing system may include in some embodiments a transceiver for transmitting and receiving data to and from other devices, or from separate locations within the same device. The processing system may also represent a multi-node controller. In various embodiments as noted, the processing system is distributed across a network topology.

While the processing system as described herein may include general purpose computers or processors along with distinct types of memory and storage, it should be understood that one or more of the functions performed by the processing system may be performed in hardware, middleware, firmware, etc.

The processing system may constitute one or more neural networks, each of which includes interconnected nodes that are inspired by the structure and function of the human brain. In this capacity, the processing system, or portions thereof, may include a large number of interconnected processors that act as nodes. In other examples, the processing system of a NIC may include the NIC's controller(s) or processor(s). The processing system of a NIC or an MCU may include the processing circuitry in either, or, or both. Unlike in the automotive industry, these nodes are intended to mimic the human mind (such as in Artificial Intelligence and Machine Learning (ML)) in that they are more amenable to recognizing relationships between copious datasets. They are also adaptable, and in this case, they may be used both in retraining an ML model. Neural networks may be used in a variety of other applications to identify trends, such as financial trends and trends relevant to medical functions within a patient, trends in developing new medications, etc. Thus, the inclusion of neural networks as a main portion of the processing system, whether local or distributed, enhances both the retraining process and the multi-model filtering process. Some of the data transmitted (e.g., patient measurements) may qualify as critical traffic, and as such, the principles of the present disclosure may be applicable to ensure that data arrives at a preordained time.

In the context of a network of ECUs in a vehicle, each ECU connected to a relevant network topology may include MCUs. Unless otherwise evident from the context of a statement, the processing system may refer to the collection of MCUs where each MCU participates in executing code described herein, including code relevant to both the integration of TSN traffic shaper configurations with RDMA NIC hardware elements and calculating TSN traffic shaper configurations that ensure lossless data exchanges for critical traffic (CT) with bounded latencies.

Within a vehicle, it is common to find over 100 ECUs. These ECUs may control important actions such as the application of brakes, the changing of gears in a transmission, various aspects of the engine, air-conditioning, steering, cameras, radar, and acoustic sensors for both cellular and non-cellular wireless communications, among other tasks. ECUs may communicate information with each other using vehicle buses, cables, controller area networks, local area networks, media/oriented systems transport (MOST), local interconnect networks (LINs) and FlexRay, to name a few. With this description it is unsurprising that for many of these ECUs, assuring timely arrival of essential data is paramount.

Recently, the evolution of vehicles has taken a data intensive approach in which the vehicle's main sensors produced voluminous data, which in turn is regularly transmitted to different nodes in the vehicle for storage in a local memory. Sensor data is sometimes sent "blindly" between different entities, regardless of whether the data had changed.

By contrast, in more recently developed Service oriented architectures (SOAs), a more pragmatic approach is adopted. The sender transmits data when at least one receiver currently on the network needs it. These limited communications obviated a lot of the redundant transmissions that needlessly consumed bandwidth and increased latencies of high-priority messages. A further evolutionary advance in some implementations is that SOA may rely on the presence of middleware. With present middleware in circulation and used in and across SOAs, developers may concentrate on scalable architectures to design SOA software for vehicles, such that the complexity and number of instructions may be proportionate to the size and functional sophistication level of the vehicle. Scalable service-oriented middleware over IP is responsible for the acronym SOME/IP. Another popular open source middleware is AUTomotive Open System ARchitecture (AUTOSAR), which was developed by a consortium of worldwide automobile manufacturers working as members. To date, AUTOSAR has promulgated solutions that offer increased flexibility using more tailored and uniform standards.

To further increase the rate of memory operations, such as accesses and writes, the inventors have proposed adopting the use of RDMA in vehicles. RDMA includes a direct memory access from the memory of one node into that of another node without involving either one's operating system and without interrupting the processing activities of the target. FIG. 1A is a block diagram of an existing server performing a memory access with another server. A simplified two-node connection 100A is shown, where the network 103 connecting the nodes is illustrated by a single connection, for simplicity. While FIG. 1A shows three layers (application layer 120*a*, sockets layer 123*a*, and transport protocol layer 125*a*) for simplicity, these layers are exemplary in nature and several additional or different layers may be implemented in other cases. A program at the application layer 120*a* may initiate the sending of a message from node or initiating server 104 to node or target server 108. The processing system of the initiating server 104 initiates the memory write at a target server 108. To consummate a memory operation (e.g., a write), a copy C1 of the data that is the subject of the transfer is first buffered in buffer B1 at the application layer 120*a*. Another copy C2 of the data is buffered in buffer B2 at the sockets layer 123*a*. A third copy C3 of the data is buffered in buffer C3 in the transport protocol layer (TPL) 125*a*. These buffering operations add delay to the sending of the message and burden the processing and operating systems. The data is finally passed to the NIC 128*a* operated by the NIC driver 127*a*. It is passed via a wire, cable, or network 103 and some relevant network protocol to the NIC 128*b* of the target server 108. The receiver in the NIC 128*b* is controlled by the NIC driver 127*b*. The travelling data stream is received at the physical layer and has to traverse the upper layers once again. To this end, a fourth copy C4 of the data is stored in buffer B3 at the corresponding TPL layer 125*b*. The memory write is now under control of the processing system of the target server 108 as a fifth copy of the data is stored in buffer B5 of the target server 108. Processing and operating system utilities are involved in these transactions, including the next data transfer to copy C6 at the application layer 120*b*. Thereafter at some point, the processing system deposits the datastream in a memory for use by the target server 108 or a program therein.

Figure 1B:
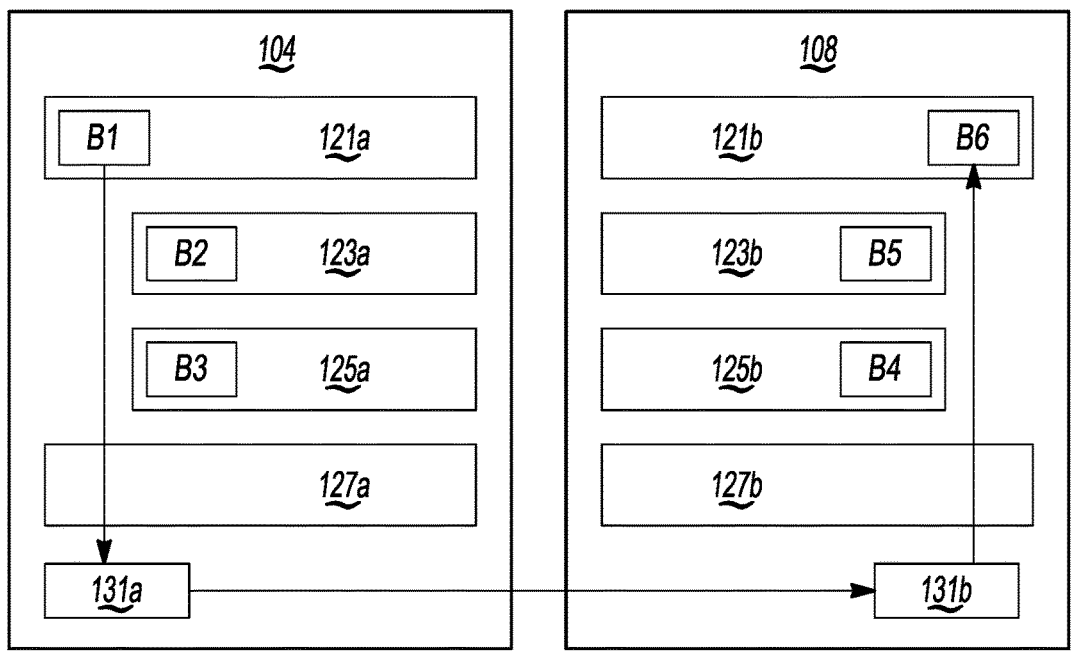
FIG. 1B is a block diagram of a server performing a remote direct memory access (RDMA) with another server.

Based on the stuttering nature of the data over the above write operation in which six copies of data are buffered, it becomes evident that the existing technique for memory transfers are sub-optimal. Another solution was needed. As noted, RDMA-equipped devices were considered. RDMA was initially developed for use in Data Centers, in which network area storage (NAS) devices were connected to a Data Center server, to expedite high volume, high-speed memory transfers. FIG. 1B is a block diagram of a server performing a remote direct memory access (RDMA) with another server using RDMA over Converged Ethernet (ROCE) using a simplified two-node connection 100B. As noted above with respect to FIG. 1A, the layers are exemplary in nature and in practice, additional or different layers may be implemented. RoCE is a specification to provide efficient data transfers not involving the CPU with low latencies on lossless Ethernet networks. Like RDMA, RoCE and its various flavors were initially developed for use in Data Centers. In FIG. 1B, a two-node connection is shown. In an ROCE write (although RDMA and ROCE also apply to reads), the data to be written from the initiating server 104 is stored in buffer B1 in the application layer 121*a* and is then directly transferred to the ROCE NIC 131*a*, thereby bypassing the sockets layer 123*a* and its buffer and bypassing the TPP layer 125*a* and its buffer B3. Similarly, as the data is transmitted via an Ethernet protocol to ROCE NIC 131*b* at the target server 108, it bypasses the same layers 123*a*, 123*b*, 125*a*, and 125*b* and arrives at buffer B6 at the corresponding application layer 121*b*, where the data is stored in memory without processor involvement.

Significant problems exist with the approaches of FIGS. 1A and 1B when applied in a network environment that needs but fails to guarantee bounded latencies (e.g., the assured arrival of periodic data by or before a time certain) with respect to high priority classes of data. Currently, Data Centers use ROCE. In data centers, it is common to achieve lossless transmission using flow control mechanisms. If a receiving node cannot keep up with consuming data at the data rate in which the data is sent, the receiving node requests a pause. Critical data for an application may not timely arrive.

Figure 2:
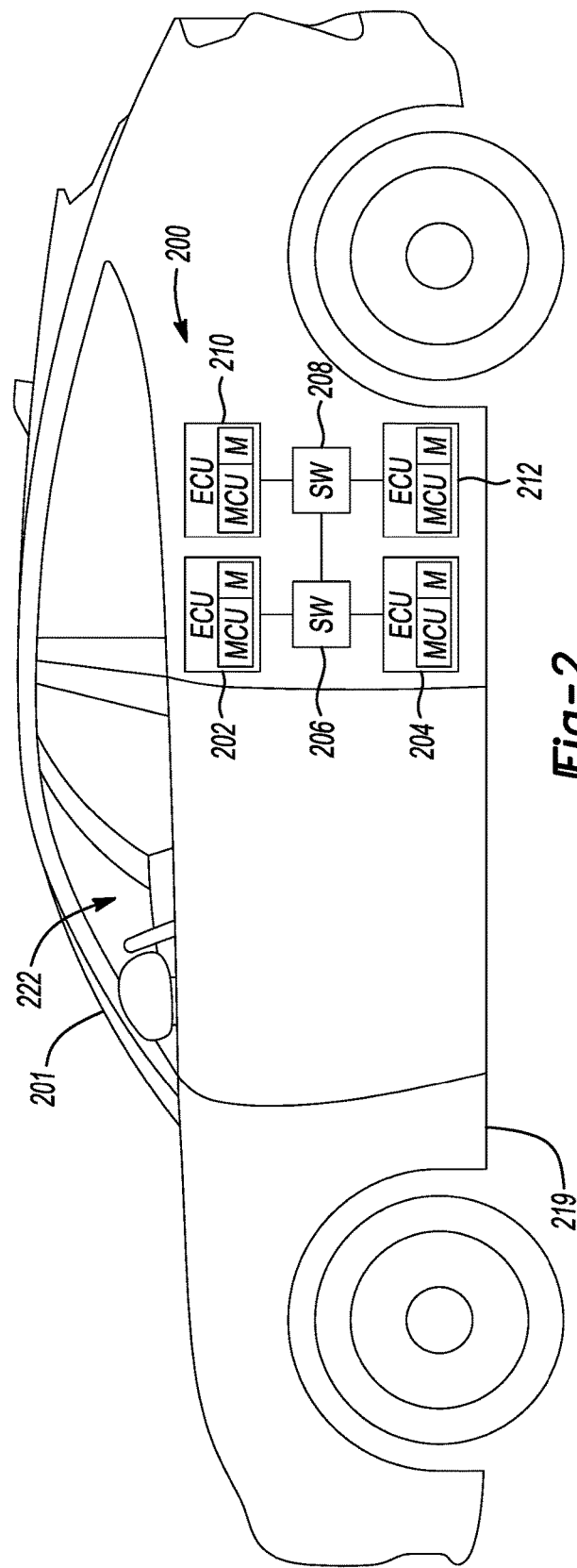
FIG. 2 is a conceptual diagram of a vehicle including a network of Electronic Control Units (ECUs) for implementing various functions within the vehicle.

FIG. 2 is a conceptual diagram of a vehicle 201 including a network 200 of Electronic Control Units (ECUs) 202, 204, 210, and 212 for implementing various functions within the vehicle. It should be noted that FIG. 2 is a simplified diagram, because the ECU network 200 in practice is located within the frame 219 of the vehicle 201 and does not protrude into the passenger cabin 222. Here, network 200 is simply overlaid without a specific position for simplicity. An ECU includes an apparatus within the body of a vehicle that is tasked with performing a specific function, such as airbags, brakes, power door locks, etc. ECUs often work in tandem with one another, and as such, they may be selectively or broadly networked together using an appropriate network topology or combination of topologies. ECUs commonly control critical functions in a vehicle. In an example case, the four ECUs (ECU 202, ECU 204, ECU 210, ECU 212) are coupled together via a Fast Ethernet protocol that includes switches 206 and 208. Each ECU includes at least one MCU and a memory from which to retrieve executable code and a NIC or transceiver (XCVR) to transmit and receive data. While the network 200 is simple, one objective of the network 200 is to demonstrate that a system of ECUs may represent a topological network in a vehicle. As noted above, a number of ECU functions involve the need for lossless data with bounded latencies, because the ECUs control many primary elements of the vehicle including braking, airbags, transmission operation, and many others. For this reason, different ECUs may transmit different priorities of data traffic, including critical traffic (CT), which includes data at the highest priority level where the lossless datastreams has to arrive within a bounded time. This phenomenon may occur in real-time applications such as braking. One objective of the disclosure is to enable ECUs to perform data transmissions including RDMA transfers which guarantee lossless transmission at a bounded latency. The processing system may include the individual MCUs and memory in an ECU (e.g., ECU 202), or where appropriate in the context, the processing system may refer to the four MCUs and associated memories, or a separate computing device. The size of the network may vary from four nodes (as here, with four ECUs 202, 204, 210, 212) to another number. The inventors of the present disclosure made the following observations regarding FIG. 1B and the use of ROCE. They noted that first, Converged Ethernet's flow control mechanisms do not provide bounded latency guarantees. Such guarantees are relevant for vehicular real-time control use cases. Second, Converged Ethernet's Congestion Control protocols cause Head-Of-Line Blocking issues. For example, Pause Frames and Priority Based Flow Control (PFC) result in Head-Of-Line Blocking problems, where data streams that did not otherwise cause congestion and do not contribute to congestion are unnecessarily throttled down. Third, Control algorithms with low latency requirements tend to send data at fixed rates. However, Converged Ethernet has no mechanism to enable latency optimization for periodic data. As such, RDMA and RoCE systems that are based on Converged Ethernet and/or flow control are patently incompatible with the needs of a vehicle network. Fourth, the combined use of Converged Ethernet and time-sensitive networking (TSN) within in-vehicle networks is undesirable for further reasons. Examples include that automotive ethernet systems more commonly use protocols from the TSN ethernet protocol family for QoS guarantees. Further, the combined use of TSN and Converged Ethernet is undesirable as it increases system complexity. Ethernet's three-bit priority code point (PCP) field places a hard limit on the number of priorities and QoS mechanisms for different data streams that may coexist in a vehicular Ethernet system.

While the examples in certain embodiments herein rely on Ethernet as the network protocol, it should be noted that the disclosure is not so limiting and that the principles described below may have equal applicability to other network protocols. This tenet is also true for the use of the principles herein in the context of other network technologies outside the vehicle space that have latency needs and use CT streams and RDMA that need to have a maximum latency.

In one aspect of the disclosure, to overcome the above-referenced shortcomings of Converged Ethernet for automotive applications, TSN traffic shapers are integrated with RDMA NIC hardware, and are configured as per the techniques and systems described in greater detail below. FIG. 6 shows a simplified example of such a configuration. In another aspect of the disclosure, a technique for calculating TSN traffic shaper configurations that ensure lossless RDMA data exchange with bounded latency is introduced. Prior to describing the architecture of a network modified to comport with the former aspect of the disclosure, the following discussion introduces certain background information. Further, while embodiments below describe the implementation of these aspects in the context of an automotive network, the principles herein have wider application to networks with similar latency needs. Thus, a discussion for introducing an example node purely for illustrative purposes is shown, followed by a discussion of the underlying principles that enable these aspects to enable achievement of guaranteed transmission time latencies. It will be appreciated that the disclosure assumes a practitioner's understanding of the content of the relevant IEEE provisions, concepts including TSN, traffic shaping, and token buckets. Token bucket algorithms commonly are used to implement transmission rate limiting. They allocate a fixed number of tokens to a hypothetical bucket. Each transaction, such as a transmission or other request, costs a token, which may be refilled into the bucket at a predetermined rate.

Figure 3:
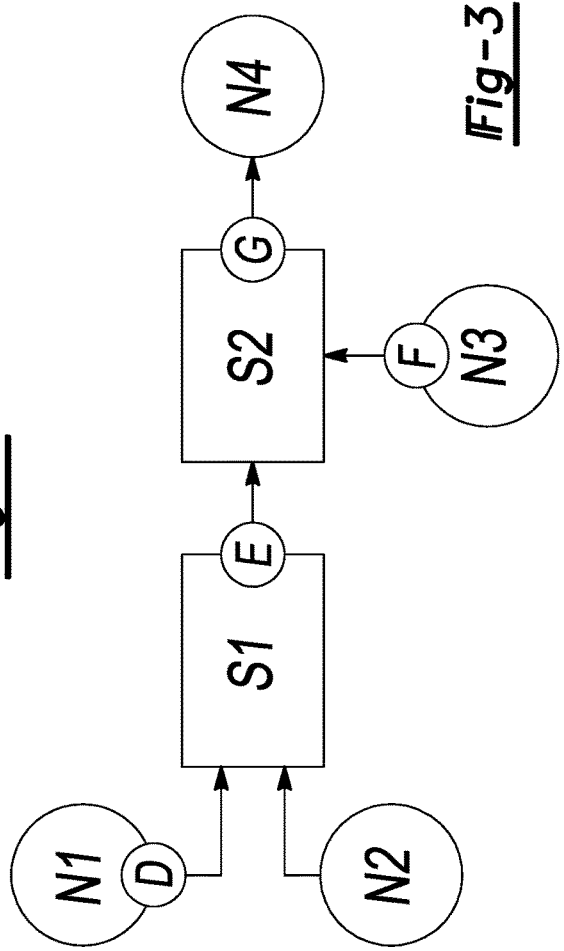
FIG. 3 is an example block diagram of a network of nodes including ports and switches in accordance with the present disclosure.

FIG. 3 is an example block diagram of a network of nodes N1, N2, N3, and N4 including ports D, E, F, G and switches S1 and S2 in accordance with the present disclosure. In various embodiments, nodes N1-N4 may be ECUs that are wired or networked together, in part or in full, within an automobile or other transport structure. The principles of this disclosure may also extend to other types of networks, including networks having high priority data transfer needs. The ECUs may include MCUs and other processing hardware, as well as analog circuits. The nodes and switches may also have egress ports D-G in which data may be arranged for serial or parallel transmission using some designated priority (egress queues). For purposes of the following example, nodes N1, S1, N3, and S2 are associated with egress ports at D, E, F and G. In other embodiments, each of the nodes and switches may also include ingress ports through which data is received. As noted above, at present RDMA with Converged Ethernet is unable to guarantee a transmission with a bounded latency. FIG. 3 shows an example network using the principles of the present disclosure to guarantee such a latency by integrating time-sensitive networking (TSN) traffic shapers with RDMA hardware. That is to say, traffic shaping may be used to guarantee lossless transmissions and bounded latencies for RDMA send/receive and/or read/write operations, or longer data transmissions that include RDMA accesses/writes.

Certain embodiments described herein use the asynchronous traffic shaper (ATS) and the Institute for Electrical and Electronic Engineers (IEEE) 802.1Qcr of the TSN protocol suite for exemplary purposes. There also exists so-called "time aware shapers." For example, the ATSs use specific calculated numerical patterns to determine whether a generated datastream is eligible for transmission, dropping lower priority transmissions to ensure that the CT arrives within a specified interval. The ATS specified in IEEE 802.1Qcr prioritizes and schedules traffic using per-class queueing and per-stream reshaping. However, the techniques are not so limited, and other traffic shapers and configurations may be used. It should also be understood that, while traffic shapers are illustrated in the context of an ECU network in a vehicle for purposes of example, the principles of this disclosure may be applied to diverse types of architectures or systems where lossless transmissions and bounded latencies are significant. In addition, the principles of this disclosure have wide application and may be applied to different topologies, frame sizes, frame rates, sender/receiver relationships, and the like.

The RDMA hardware in various embodiments may be found in the network interface card (NIC) of a node. The NIC may be coupled to, or integrated with, the ECU or MCU at a node. In the examples described herein, a worst case latency may be identified to ensure that an important activity (e.g., slowing/stopping a vehicle in response to application of the brakes) may be implemented within a time certain. For clarity, the example in FIG. 3 just shows data transmitted from other nodes to node N4. In actuality, the below principles may apply with equal force to the transmission and/or reception of data at a node, concurrently or otherwise. For purposes of FIG. 3, periodic frames A and B are being transferred from node N1 and that are assumed to have lossless transmission and bounded latency constraints. These data frames transmitted from egress ports are known as critical traffic (CT). The destination of frames A and B is node N4.

Thus, one issue in the example of FIG. 3 is calculating, for different transmission paths of the data, the worst case latency from periodic frames available for transmission at various egress ports to the actual receipt of the completed transmissions at node N4. The following transmission paths are used in this example:

(1) Node N1 sends frame A of length 1024 bytes via egress port D every 100 milliseconds (ms).
(2) Node N1 separately sends frame B of length 256 bytes via egress port D every 10 ms.
(3) Node N2 sends random bursts of best effort traffic (i.e., non-CT data).
(4) Node N3 sends frame C of length 128 bytes via egress port F every 50 ms.

In the above transmissions, it is assumed that transmissions of (1), (2) and (4) are CT transmissions, whereas transmissions of (3) are not CT transmissions. Instead, the transmissions of (3) are considered "best effort" transmissions. The best effort transmissions of (3) do not have lossless transmission or bounded latency constraints. Switch S1 receives periodic frames A and B from nodes N1 and N2 as well as the best effort bursts from node N2. The data is transmitted through switch S1 via egress port E. Switch S2 receives the data from egress port E of switch S1 as well as periodic frame C from egress port F at node N3. The data from S2 is then transmitted via egress port G to node N4. That is to say, N4 receives traffic sent by N1, N2, and N3. Each transmission in this example includes an exemplary transmission path to get from an origin node to the destination node N4.

The CT frames identified above may include RDMA protocol overhead and RDMA payload data. The RDMA payload data in this example may include information that is periodically written to or read from remote memory locations via periodic RDMA send/receive or read/write operations. In this configuration, it is assumed that each link uses fast Ethernet (100 Mbit/sec) in the exemplary calculations below. However, other network protocols may be used. Further there may be more than one network, network type or network protocol in use, concurrently or otherwise.

According to an aspect of the disclosure, methods and systems for calculating TSN traffic shaper configurations that ensure lossless RDMA data exchange are described. For ease of understanding and to avoid unduly obscuring the concepts in this disclosure, two classes of service are described. However, in other implementations, another number of service classes may be used, including 3, 4, 5, and so on. The techniques for manipulating the service classes and guaranteeing bounded latencies may be performed by or on one or more of nodes N1-N4 in an exemplary network of connected ECUs in a vehicle. Additional classes of service may be defined as needed, provided that the shaped CT has the highest priority.

In sum, the example of FIG. 3 assumes a minimum of two classes of service. The processing system configures higher PCP (priority code points) for CT, and lower PCP for BE traffic. As noted, additional classes of service may be defined that are not given higher priority than the CT.

Configuration of Egress Queues and ATS Shaper

Each of the egress ports D, E, F and G may be associated with egress queues, which may include areas in which data is buffered and/or arranged in different configurations (depending on the hardware architecture, for example) as it exits the egress port to follow a transmission path (e.g., from egress port D of node N1, via S1 with corresponding egress port E, then S2 with corresponding egress port G, to arrive at node N4. A similar concept applies to ingress ports and corresponding ingress queues. As one example, a first egress port may include two egress queues to account respectively for two different priority types of data. In one configuration, each of the two egress queues may include a serial path that may arrange and buffer data for the flow of data through the first egress port along a transmission path. Different queue architectures may also be used in other configurations, and a greater or lesser number of egress queues may be used for an egress port. Each egress queue may be empty, or each egress queue may be partially or completely full.

In egress ports D, E, F, and G, the processing system configures higher priority PCP for CT, and lower priority PCP for best effort (BE) traffic. For egress ports D, E, F, and G, the processing system may configure the egress queues associated with the CT to be managed by the ATS shaper, described further herein.

In various embodiments, the configurations of the egress queues are performed by the MCUs within the nodes that have the identified ports. In other embodiments, a centralized MCU may be used to perform the configurations for each of the egress queues associated with egress ports D, E, F and G. In addition, for the egress ports, the corresponding nodes may configure egress queues associated with BE traffic strictly in terms of order of priority (without traffic shaping). As noted above, these and other configurations may be performed by a processing system, which may include different ones of these (and other) types of processor resources and configurations.

The ATS according to IEEE 802.Qcr includes a set of functions for prioritizing and scheduling different classes of traffic using techniques like queuing on the basis of class, and reshaping data on a per-stream basis. The ATS decides on egress; that is, the ATS determines when each packet is eligible for transmission. Once the eligibility time is reached, the packet may then be transmitted. Transmission eligibility time may be determined independently for multiple transmission streams. The transmission eligibility time may be calculated using two parameters called the committed information rate (CIR) and the committed burst rate (CBR). The CIR is a value used to specify an average outbound traffic rate to which the traffic across a transmission path is limited. The CBR is a parameter relevant to allowing temporary increases of the data rate above the CIR. As noted, while the above-described ATS is used here for example purposes, the aspects of the present disclosure may be extended to other shapers of the TSN suite as well.

Figure 4:
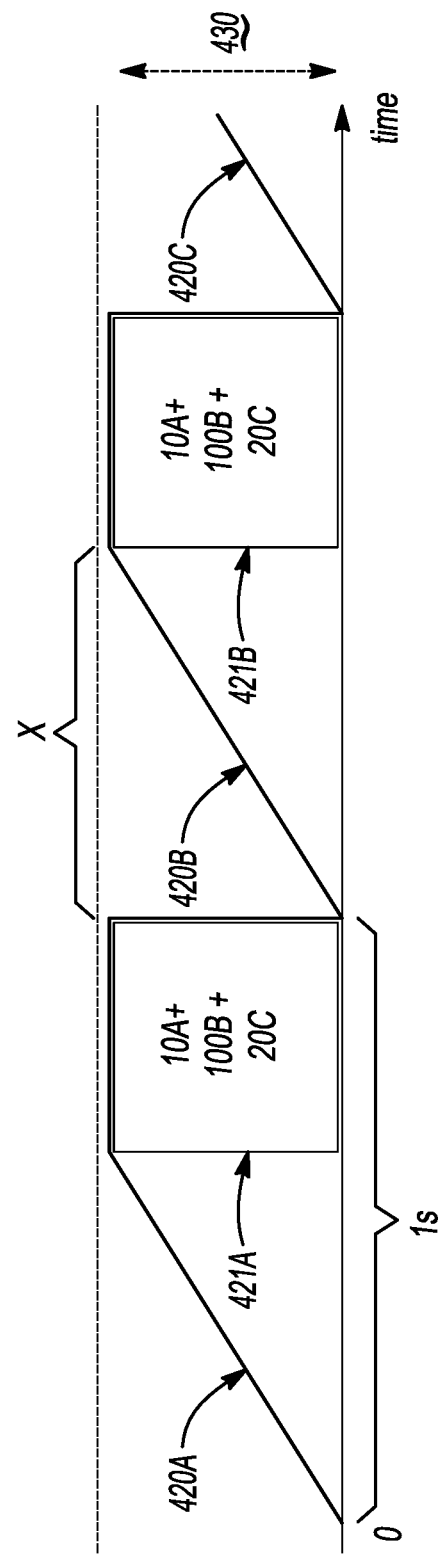
FIG. 4 is an example timing diagram conceptually demonstrating the use of a committed information rate to guarantee a bound latency relating to a high priority function that uses critical traffic (CT) for communication purposes.

FIG. 4 is an example timing diagram conceptually demonstrating the use of a committed information rate (CIR) and a committed burst size (CBS) to guarantee a transmission over a prescribed transmission path having a bound latency relating to a high priority function (e.g., the transmission of CT). That is, FIG. 4 is a conceptual representation of one example of a technique for guaranteeing a lossless data rate and bounded latency of periodic transmissions. The horizontal axis represents time, and the vertical axis denotes a conceptual view of the transmission of data and the manner in which critical priority needs may be guaranteed. More specifically, FIG. 4 demonstrates how to configure CIR and CBS for egress port G, the egress port through which the traffic in this example flows to arrive at N4. The waveform representations in the diagram are simplified to show transmission of a single frame at the latter portion of the each of the first and second 1-second intervals, respectively. Thus, the single frame in 421A and in 421B is a concatenation of other frames, as discussed below. The diagram of FIG. 4 includes a diagonal line 420A that begins at the first 1-second interval and that ramps up to the single frame 421A positioned at the latter portion of the first 1-second (or 1s) interval. A second diagonal line 420B begins in time at the end of the first 1-second interval, and that ramps up to the single frame 421B positioned at the latter portion of the second 1-second time interval. The second diagonal line 420B is also associated with a horizontal "X" designation, the relevance of which is described below. At the end of single frame 421B (which ends at the end of the second 1-second interval), a third diagonal line 420C is shown. The purpose of the third diagonal line 420C is simply to show that processes represented by these intervals are periodic. They may repeat for as long as needed in a given implementation, and frames similar to single frame 421A and single frame 421B are likewise repeated for the desired length.

It was noted above that each of single frames 421A and 421B is a simplified representation in which a concatenation of frames are transmitted. Referring back to FIG. 3 and the accompanying text, it was also noted that: N1 transmits a 1024-byte frame A every 100 ms and a 256-byte frame B every 10 ms; N2 transmits burst of BE traffic (not explicitly included in the frames of FIG. 4 because N2's transmissions are not CT and thus need not be guaranteed); and N3 sends a third 128-byte frame every 50s. Thus, in a 1-second interval, the transmission rates (frequencies) are as follows:

1. Ten 1024-byte frame As are transmitted, i.e.;

$$\left[\frac{\text{frame }A}{100 \text{ ms}} \times \frac{1000 \text{ ms}}{1 \text{ s}} = 10\frac{\text{Frame }A}{\text{s}}\right];$$

2. One hundred 256-byte frame Bs are transmitted, i.e.;

$$\left[\frac{\text{frame }B}{10 \text{ ms}} \times \frac{1000 \text{ ms}}{1 \text{ s}} = 100\frac{\text{Frame }B}{\text{s}}\right];$$

and

3. Twenty 128-byte frame Cs are transmitted, i.e.;

$$\left[\frac{\text{frame }c}{100 \text{ ms}} \times \frac{1000 \text{ ms}}{1 \text{ s}} = 20\frac{\text{Frame }C}{\text{s}}\right];$$

From this data it may be concluded in FIG. 4 that a total of 130 frames will arrive at N4 over the course of each 1-second interval. That is, single frame 421A would include 10A+100B+20C frames, representing the total of 130 frames (albeit of three different quantities), and single frame 421B would have the same data requirements. From the above calculations, the quantity X of FIG. 4 may be determined. The quantity X represents the portion of each 1-second interval during which the token bucket is needed to fill from 0 to the CBS quantity. The CBS includes the number of allocated bytes available for bursts of frames that are transmitted temporarily at rates above the CIR, while nevertheless meeting a guaranteed bound. The formula for calculating the quantity X in this example is:

$$X = 1[\text{sec}] - [\text{duration of total } CT \text{ transmission at available data rate}]$$

The total CT is the total number of bytes transmitted in each frame, e.g., single frames 421A and 421B. The total number of bytes, in turn, that will arrive at N4 every 1-second interval can be determined from the following calculation: (1024 bytes)(10)+(256 bytes)(100)+(128 bytes)(20)=38,400 bytes=CIR. To guarantee a bounded latency in this example, 38,400 bytes transmitted from the CT sources described in FIG. 3 need to arrive at N4 (FIG. 3) within every second. Further, to subsume each of the 130 frames conceptually in one Frame of size 38,400 simplifies the calculation of the CIR that, in turn, enables one objective of this example of the present disclosure—namely, to guarantee that each of the 130 frames are sent over the course of 1s.

It was noted with reference to FIG. 3 that fast Ethernet having a 100 Mbit/second data rate is used in connection with these example network transmissions. Thus, for the calculation of the quantity X:

$$X[\text{sec}] =$$
$$1[\text{sec}] - \text{duration of } CT \text{ transmission of } 38,400[\text{bytes}] \text{ at } 100\frac{Mbits}{\text{sec}} =$$
$$1[\text{sec}] - 38,400 \text{ bytes}[8 \text{ bits/byte}] 1 \text{ sec}/10^8 \text{ bits} = 0.997[\text{sec}]$$

Now that the value for the quantity X has been obtained, the next step in this example is to calculate CIR, which is used to specify an average outbound traffic rate to which the traffic is limited. More specifically, the value of CIR [Mbit/s] required to build up a token credit of the total CT traffic per interval (38,400 [bytes]) within the quantity $$X[0.997[s]] =$$
$$[38,400 \text{ bytes}[8 \text{ bits/byte}][1 \text{ Mbit}/10^6 \text{ bits}]/0.997 \text{ sec}] =$$
$$0.308\frac{Mbit}{\text{sec}} = CIR$$

Accordingly, CIR=0.308 Mbit/sec. Next, configuring egress port G's (FIG. 3) ATS shaper using the obtained value of CIR=0.308 [Mbit/s] and CBS=38,400 bytes ensures sufficient bandwidth for guaranteed lossless transmission of critical traffic from egress port D over the transmission path to N4.

As noted, the asynchronous traffic shaper (ATS) determines the transmission eligibility for each frame. Once this time is reached, the packet is allowed to be sent, resulting in shaped output traffic. Transmission times may be calculated independently for multiple streams. The transmission time is determined by the asynchronous shaper algorithm using the CIR and CBR. The CIR is a slope value using a token bucket or credit-based shaper. That is, CIR specifies an average outgoing data rate limiting the traffic. The CBR allows temporary increases of this limit. The traffic shaper ensures that packets have a bounded time latency in the queue, e.g., by not transmitting non-CT packets that would exceed the limit. ATS algorithms are set forth in IEEE 802.1Qcr of the IEEE (2020), the contents of which are incorporated by reference as if fully set forth herein. Examples of ATS are described further below.

Configuring ports D, E, F, G using the example method described above ensures guaranteed lossless transmission of critical traffic in the system or network of nodes and results in individual/different CIR and CBS configuration parameter values for each egress port. While the above example set is instructive, it should be understood that the principles of the present disclosure should not be so limited. Larger and more or less complex networks may utilize the principles of this disclosure to prioritize different classes of data versus CT and to guarantee lossless CT transmissions that arrive in each interval on time, without delay. It should also be noted that, while the interval is 1 second in the above example for simplicity of the calculations to comport with the identified data rate, the duration of the interval may vary widely. In addition, the principles of the present disclosure apply to different network topologies, including the various Wi-Fi™ technologies. If the topology has more than one node that receives critical traffic, then every burst of CT that passes through the transmission path is considered relevant to the calculations.

In another aspect of the disclosure, the principles above may be used to ensure low bounded latency for CTs as is now described. Some terms that may be relevant include the Long Frame Transmission Time (LFT), often expressed in microseconds [μs]. The LFT includes the time for transmitting a maximum length best effort Ethernet frame (e.g., 1500 bytes) at line rate. Assuming for this example a system configured for frame preemption (IEEE 802.1Qbu), the LFT is instead interpreted to be the frame preemption time. The Switch Fabric Delay [μs] (SD) represents the delay caused by the Switch Fabric between a frame received at ingress and a frame available at an egress queue. The Frame Transmission Time (FT(len) [μs]) is a function that calculates the transmission duration for a frame with a length of "len" bytes at line rate. FT expressed alone calculates the transmission duration. The Link Delay (LD) [μs] includes the delay caused by a maximum-length link present in the topology at issue (e.g., a collection of nodes). The term WCL(frame type) refers to the maximum latency for CT of type 'frame type.' The term WCL (worst case latency) itself refers to the maximum latency for a CT frame. It is noted that both us and ms are units of time, and the above time parameters can also be expressed in ms.

With this framework, another example is presented using the node configuration of FIG. 3. The example involves calculating the WCL from frame A (1024 bytes every 100 ms) for transmission at egress port D at N1 to the point where frame A is received by N4. First, the N1 WCL is calculated. It is noted that N1 transmits 256 bytes of data every 10 ms. Thus, ten frame Bs from egress port D precede each frame A transmission. Consequently, using the parlance FT(len) expressed above, 10 FT (256)+FT (1024)(eqn. 1.0) represents the WCL for frames A and B, where "len" equals 256 and 1024, respectively. Second, the WCL for switch S1 (FIG. 3) is determined. Referring to FIG. 3, S1 receives frames A and B from N1 via egress port D, and bursts of best effort (BE) traffic from N2. Thus, the WCL for S1 equals the inherent SD of S1 in addition to ten B frames added to the maximum size BE frame from N2 that may precede the transmission of frame A. Stated differently, $$WCL \text{ for } S1 = SD^{(*1)} + 10\ FT(256) + LFT + FT(1024) \quad (1.1)$$

The superscript designation (*1) of SD in equation (1.1) means that here, SD is counted once, and just for the last frame because the reception of frames at the ingress port and the forwarding of frames from ingress to egress queues is assumed to be subject to parallel asynchronous processes inside a network switch. In other embodiments, where the physical configuration of the system is different, different or multiple inherent delays may instead be considered. Third, the WCL for switch S2 is determined. It was noted that S2 receives CT from egress port G at node N3. The WCL includes the SD, two C frames, ten B frames, and one maximum size BE frame that precedes frame A. That is, $$WCL \text{ for } S2 = SD + 2\ FT(128) + 10\ FT(256) + LFT + FT(1024) \quad (1.2)$$

The WCL for frame A is computed as follows:

$$WCL(A) = \quad (1.3)$$
$$3LD + 2SD + 2\ FT(128) + 30\ FT(256) + 3\ FT(1024) + 2LFT$$

From the above calculations, the WCL for frame A was calculated in equation (eqn.)(1.3) by progressively calculating the individual WCLs for each component (eqns. 1.0-1.2), taking into account the relevant overlapping transmission paths, inherent switch delays (e.g., SD), the lengths of propagation through a physical medium (e.g., a wire, cable, conductive trace, wireless transmission, etc.) and the sum of transmissions from/through each component. In some embodiments, several types of inherent delays may be considered, including without limitation circuit delays or buffering delays. Further, while the calculations are omitted for simplicity, the WCL for frames B and C are determined in this example using the same approach as WCL(frame A), i.e., considering the individual WCLs from the initial component and through intermediate components to the receiving component (in this case N4). As with frame A, the path for the transmissions for frame B and frame C is considered, including SD, LD relevant to the length of the path of propagation from an egress port of one node to an ingress port of another node. As noted, intermediate components (e.g., switches, diodes or other circuit elements) may also be taken into account where the need arises.

Continuing with the above example, the above calculations establish that the bounded worst case latency for critical traffic is represented by the maximum of WCL(frame A), WCL(frame B), and WCL(frame C). More compactly:

$$\text{Bounded } WCL = \text{Max}(WCL(A), (WCL(B), WCL(C)) \quad (1.4)$$

While the example calculations are related to the topology of FIG. 3, the approach identified may be applied to another physical topology. Further, the configurations of the data priority classes, the egress queues and the egress ports as described above are germane to the WCL determination. These configurations ensure that no CT frames are subject to waiting for tokens to accumulate prior to frame transmission. It is also noteworthy that in this example, it is assumed that the transmission of the initial CT frame is delayed until such time when tokens have filled the bucket up to the CBS maximum. This delay occurs just once in this example at system start. The delay obviates an outcome where some extraneous situation leads to additional latencies needed for tokens to become available prior to transmission of CT frames. In some embodiments, this assumption may not be made, or it may be different in light of the physical architecture of the system in question.

Figure 5:
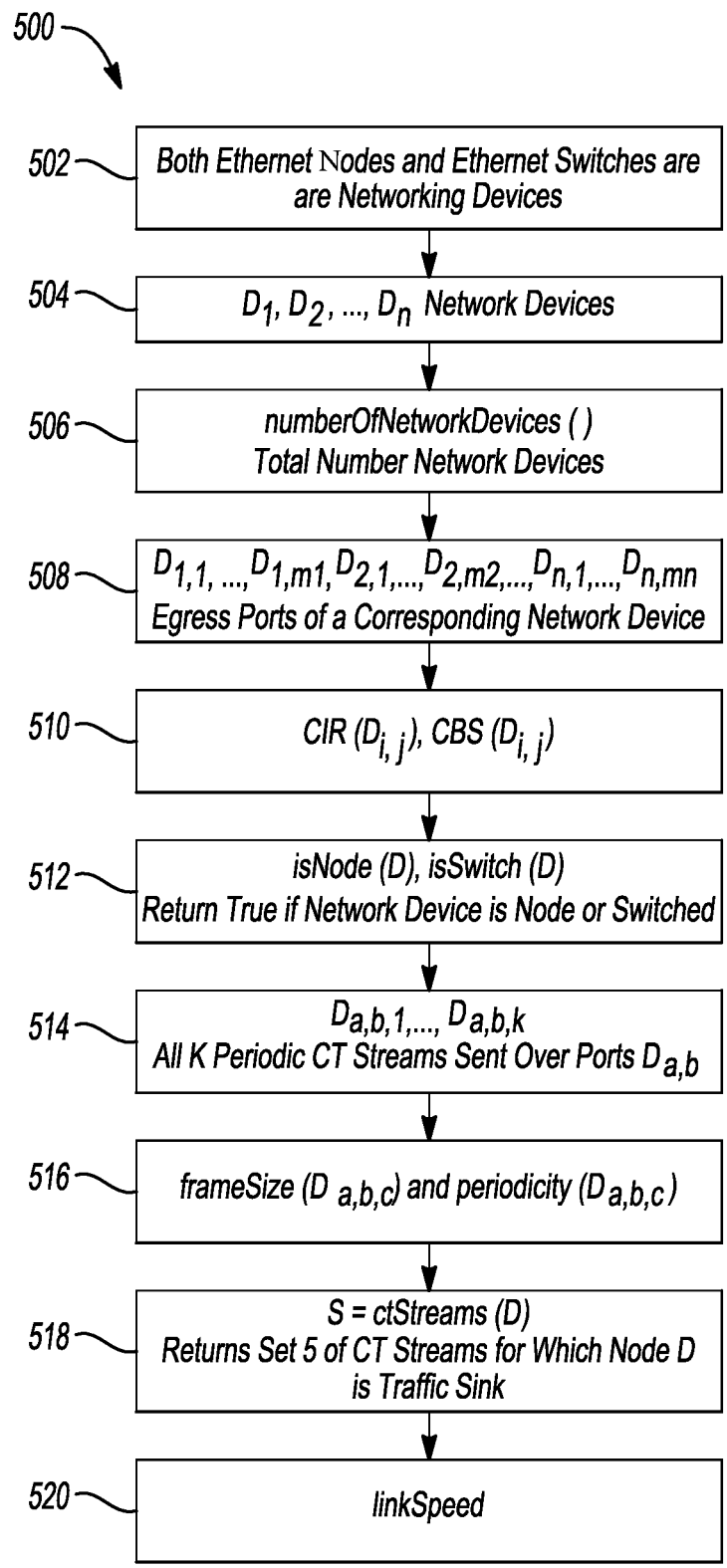
FIG. 5 is an example flow diagram of implementing a method for latency-bounded RDMA access in accordance with the present disclosure.

The above presented practical examples of guaranteeing a bounded latency for CT in a system such as an RDMA system in a vehicle or other system of nodes. FIG. 5 is an example flow diagram 500 of a method for latency-bounded RDMA accesses in accordance with the present disclosure. FIG. 5 involves the functions of defining exemplary networking devices. The figure further specifies functions that identify the topology elements that will be relevant to a bounded latency formulation. Referring initially to logic block 502, the processing system may have predefined, or may define, what constitutes "network devices" that are involved in transmission of different classes of traffic, including CT, within a network. The processing system's definition may include nodes and switches. For example, the processing system may be executing code and transmitting or receiving data in a fast Ethernet environment. Here again, while Ethernet is used in this example, the principles of the present disclosure are applicable to different network types. One objective of logic block 502 is simply to define, or to have predefined, what elements constitute network devices. In this embodiment, nodes and switches are defined as network devices.

Following logic block 502 or concurrent with it, the processing system in logic block 504 may associate the network devices with a name for use in ensuing computations, such as $D_1, D_2, \ldots, D_N$, with the subscript N being the total number of networking devices. The processing system may in some embodiments maintain in memory a list of Ethernet nodes (e.g., ECUs, a stationary network relying on CT, and the like) and Ethernet switches. In other configurations, the processing system may run an initial scan to locate Ethernet nodes and switches in the network topology. For example, in logic block 506, the processing system may execute a function called "numberOfNetworkDevices( )" This function returns the total number of network devices in the network topology.

For clarity, it should be underscored that, in FIG. 5 and in the excerpt of an algorithm expressing the calculation of CIR and other relevant parameters set forth below, these computations may in various aspects of the disclosure be executed at system design time, rather than subsequently during everyday operation, to configure the system in a manner that guarantees lossless communication and bounded latencies consistent with the above example. While determining these parameters at system design time has significant advantages, in other embodiments, these computations may also be executed or modified in or near real-time within the operational vehicle, or during "post-design time." In still other embodiments, both possibilities may be available, such that the node topology and related hardware is initially designed concurrent or overlapping in time with the system design, but that the node topology may subsequently update itself after the vehicle is built and in response to various circumstances, the computations for guaranteeing the timely arrival of lossless CT may be performed post-design in addition to the initial system design. It should also be noted that the logic blocks in FIG. 5 may occur in different orders than set forth in the figure.

In logic block 508, the network device egress ports are identified and named. For example, the processing system may identify these ports as $D_{1,1}, \ldots, D_{1,m1}, \ldots, D_{2,1}, \ldots, D_{2,m2}, \ldots, D_{n,1}, \ldots, D_{n,mn}$. The first index in the subscript of each D port is the number of network devices. The second index represents the total number of ports on the node. For example, the port $D_{1,m1}$ may be the number of the network device (e.g., $D_1$) on which the port is located. M1 may, in turn, be a value representing the total number of ports of the $D_1$ network device.

In logic block 510, the processing system may identify the configuration parameters CIR and CBS for egress port $D_{i,j}$ in Mbits/see and bits, respectively. The i and the j may correspond to the indices of a particular port such that each of the egress ports is associated with a CIR and CBS. That is, the collective set of values may be named CIR ($D_{i,j}$) and CBS ($D_{i,j}$) as shown in logic block 510. In an implementation, the processing system may initialize each of these CIR and CBS values for each port with a value of zero, because the calculations of these values has yet to occur. Referring next to logic block 512, the processing system may use two additional functions "isNode (D)" and "isSwitch (D)," where D is one of the network devices, e.g., $D_3$. The function isNode (D) returns a value 'true' if the designated network device is a node. The function isSwitch (D) likewise returns a value 'true' if the network device is a switch. These functions enable the processing system to identify the type of network device in question for subsequent calculations.

With reference to logic block 514, the processing system identifies $D_{a, b, 1}, \ldots, D_{a, b, k}$. The subscript 'k' represents a total of 'k' periodic CT streams, for which node $D_a$ is the traffic source and traffic is sent over port $D_{a,b}$. The number of periodic CT streams may, however, be larger, since k is the number of CT streams emerging from $D_a$ and flowing over $D_{a,b}$. While other naming conventions are equally possible and are within the scope and spirit of the present disclosure, the naming of the various topological elements enables the processing system to store in a local memory or a database a matrix or set of tables representing every relevant value to be used in assuring bounded latencies. Logic block 516 introduces functions frameSize ($D_{a, b, c}$) and periodicity ($D_{a, b, c}$). These functions when executed return, respectively, the frame size of one of the CT streams in bits (e.g., 1024 bytes) and the periodicity in seconds (e.g., 50 ms). Thus, the processing system can execute these functions to formulate additional matrices whose entries represent the frame size and periodicity of each CT stream. Referring to logic block 518, the processing system executes a function "ctStreams (D)," which returns the set S of CT traffic streams for which node D is the traffic sink (receiving node). This function enables the processing system to identify the CT streams that flow into a node, which is useful when calculating latencies for that node or using ATS shaping. In logic block 520, the function "linkSpeed" returns the link speed in bits/sec.

In an implementation, the functions above enable the storage of elements germane to another aspect of the disclosure, which is introducing methods for calculating configuration parameters CIR ($D_{i,j}$) and CBS ($D_{i,j}$) for each port $D_{i,j}$ of each of the network devices in a given topology. The advantages of this system, in addition to its application to RDMA operations described herein, allows the processing system to guarantee lossless and bounded latencies for CT streams that need it, rather than just a few CT streams or a small subset thereof. This aspect is also highly efficient by using in memory tables of matrix data formulated based on functions set forth in FIG. 5 to quickly execute the example algorithm below. Another benefit of these techniques is that they are scalable. For instance, they may be run on a two-node system, or a large and complex network including multiple RDMA systems integrated into the nodes-without need for material changes to the functions.

A non-exhaustive example of a pseudo-code representation of one such method to be executed by the processing system is set forth in the excerpt below. It should be noted that the steps of the following representation may be utilized by a design engineer during initial system design (e.g., network of ECUs in a vehicle). The steps enable one or more system designers to configure the CBS and CIR parameters in a manner that guarantees lossless communication with one or more bounded latencies, in a manner specified in great detail below. The logic blocks also enable, in some embodiments, the use of the algorithm to perform the same calculations by the processing system (e.g., the NIC(s) of a topological network after the design is complete).

```
For i=1 to numberOfNetworkDevices( ):
    If isSwitch(D_i):
        break;   // If break isn't executed, device D_i is a node.
    setOfCtStreams = ctStreams(D_i)   // Set of all critical traffic
    streams D_{a, b, c} that have node D_i as the sink
    For each element D_{a, b, c} in setOfCtStreams:
        fs = frameSize(D_{a, b, c})
        p = periodicity(D_{a, b, c})
        For each egress port D_{x, y} on the path from D_a to D_i:
            CBS(D_{x, y}) += 1/p * fs
        Next
    Next
Next
For all egress ports D_{x, y} in the topology:
    buildUpTime = 1 - CBS(D_{x, y})/linkSpeed
    CIR(D_{x, y})= (CBS(D_{x, y})/buildUpTime)/linkSpeed
Next
```

As noted, the above code relies on several logic blocks described in FIG. 5 that efficiently characterize the network. In some embodiments, at least a portion of the logic blocks may first be executed to initialize the above code by populating memory with tables of fields that can be scaled from a two node device to a large, complex, network. The first line specifies that various actions will be undertaken for each of the network devices. The If statement in the second line asks, for each network device in the sequence, whether isSwitch ($D_i$) is true. If true, the third line instructs the processor to execute a break, or an exit from the loop caused by line 1. As noted in line 3, if isSwitch ($D_i$) is not set to true for that network device, the break is consequently not executed, and network device $D_1$ is a node. If, by contrast, the value of isSwitch ($D_i$) is true, the break is executed, and network device $D_1$ is a switch. In the latter case, the routine breaks, and control returns to line 1, in which $D_{i+1}$ is evaluated to determine whether network device $D_{i+1}$ is a switch or node. Assuming device $D_{i+1}$ is a node, then at line four a new parameter is introduced (setOfCtStreams). setOfCtStreams is set equal to ctStreams ($D_i$). The latter parameter identifies the incoming CT streams $D_{a, b, c}$ for node $D_i$. As the For loop in line 1 is successively incremented, the set of CT streams arrive at each node. It is noteworthy that if the break of line three is executed, the device $D_i$ is a switch, and ctStreams ($D_i$) is just considered in this embodiment when device $D_i$ is a node. In a second for loop at line 5 which considers each CT stream $D_{a,b,c}$ in the set of CT streams having node $D_1$ as the sink, the frame size $f_s$ and periodicity p of each of the compliant CT streams are identified from memory. A third For loop at line 8 considers the egress ports $D_{x,y}$ that are on the path from $D_a$ to $D_1$, where $D_a$ is the CT traffic source node and $D_1$ per code line represents the CT traffic sink. For those egress ports $D_{x,y}$ in the pathway, CBS for the egress port $D_{x,y}$ is calculated at code line 9. Code lines 10-12 resolve the three respective For loops, from the innermost at code line 8 to the outermost at code line 1.

At this point, the processing system has determined the nodes and the switches in the topology, the set of one or more CT traffic streams that arrive at each of the identified sink nodes, the frame size and periodicity of each such CT traffic stream arriving at recognized sink nodes, and CBS for each egress port on each recognized path from each recognized source node to each recognized sink node. Thereupon, at code line 13, a fourth For loop identifies every egress ports $D_{x,y}$ in the topology, the buildUpTime for building a token credit is computed similarly to the above example, and with a recognized build-up time, a recognized CBS of the egress ports, and the link speed as in the above example, the CIR for each egress port is calculated in code lines 14 and 15. The loop is resolved at the last line.

The embodiment expressed above has significant benefits, including in topologies involving RDMA transfers. The initial processes executed as shown in FIG. 5 set the stage for the above code in which every relevant latency issue is accounted for. Moreover, the embodiment above is flexible in that the principles extend to another network topology, regardless of its complexities. Using the above method together with RDMA transfers increases overall network speed and efficiency. The above example method is a perfect fit for commercial or industrial applications in which it is important that a CT stream be received by a time certain.

In an aspect of the disclosure alluded to above, the use of TSN traffic shapers are integrated with RDMA NIC hardware. FIG. 6 is a set of networked nodes illustrating an RDMA operation in accordance with the present disclosure. That is to say, FIG. 6 is an embodiment in which TSN traffic shapers are integrated with RDMA NIC hardware. It should be underscored that the ROCE resources are not used, which further simplifies the design of the network. The diagram shows the types of extensions and mechanisms needed to enable an automotive software framework to support RDMA communications and to incorporate the aforementioned principles of the disclosure. Examples of such frameworks may include classic AUTOSAR, although for both vehicular and non-vehicular networks, other frameworks may be used. In various embodiments, many ECUs are networked together. For simplicity and to avoid unduly obscuring the concepts of the disclosure, two ECUs in FIG. 6 represent node 600a and node 600b coupled together by a network connection 625 such as Ethernet. In practice, an arbitrary number of nodes may be networked together as needed. At the software application layer, node 600a may include one or more control applications 604a labelled $C1_{A,LL}$, $C2_{A,LL}$ and $C3_{A,BE}$. These control applications may control a single feature, e.g., power door locks, or they may control multiple features. The other node 600b includes control applications 604b also specified as $C1_{A,LL}$, $C2_{A,LL}$ and $C3_{A,BE}$. Beneath the application layer is the Runtime Environment (RTE) Middleware layers 605a and 605b, which provide communication services for AUTOSAR software components (SWC) and applications containing AUTOSAR sensor/actuator parts. AUTOSAR software components (SWC) may be made independent of mapping to a particular ECU. These routines include, for nodes 600a and 600b, C1:M1, C1:M2, C2:M2, C2:M1, and C3: SIF. Following the RTE layers 605a and 605b are the Base Software layers (BSW) 606a and 606b, popularly called the BSW helps facilitates the functions that help achieve hardware abstraction. In addition, many RDMA features are built into this layer. These features include, for example, RDMA data channel configuration modules (which send RDMA commands via successive command channels to the RTE layers 605a and 605b), RDMA write modules, RDMA read modules, and Com Stack modules. A module "uverbs" is shown in the nodes 600a and 600b as interfacing with the respective RDMA data channel configuration modules and modules 651a and 651b. At nodes 600a and 600b, the RDMA read modules are respectively coupled to modules 651a and 651b via connections 631a (node 600a) and 631b (node 600b), as explained further below. At the respective hardware layers 608a and 608b, modules 651a and 651b reside. In another aspect of the disclosure, the ROCE NIC is removed and the TSN shapers are instead included. It was noted that Converged Ethernet is incompatible with the various aspects of the modified ECUs. The MCUs are also included in respective hardware layers 608a and 608b. For the example below, node 600b expressly identifies physical memory, which includes data M1 and M2 for control application C1, and data M1 for control application C2. Having described the layout, the principal elements of the diagram and their functions according to this aspect of the disclosure are described below.

Applicant's restyling of the configuration of nodes 600a and 600b enables an automotive software framework such as classic AUTOSAR to support RDMA communications. To this end, the following description of extensions to enable the automotive software framework to support RDMA communication are set forth using AUTOSAR as an example. For each node 600a-b, RTE (605a and 605b) and BSW (606a and 606b) incorporate the AUTOSAR Runtime Environment and AUTOSAR Basic Software. The RDMA data channel configurations on nodes 600a and 600b enable the application software to configure RDMA data channels (e.g., queue-pairs). The uverbs modules on nodes 600a and 600b include RDMA's standardized application programming interface (API). Regarding the control applications $C1_{A,LL}$, $C2_{A,LL}$ and $C3_{A,BE}$, the first indices A or B indicate the node that hosts the algorithm. The second indices, LL and BE, respectively, indicate whether the data transmission needs are LL (low latency) or BE (best effort). The control routines C1:M1, C1:M2, C2:M1, C3: SIF at the RTE layers 605a and 605b identify the AUTOSAR RTE Interface for control algorithms C1 to C3. For example, C1:M1 on node 600a is an RTE interface that enables $C1_{A,LL}$ to write to a local temporary memory buffer assigned to C1:M1 on node 600a. As another example, C1:M1 on node 600b is an RTE interface that enables $C1_{B,LL}$ to write to the memory region C1:M1 on node 600b.

As yet another example, C3: SIF on node 600b is an RTE interface that enables $C3_{B,BE}$ to read data that is delivered via AUTOSAR's traditional (non-RDMA) COM stack on node 600b. The RDMA write module on node 600a writes data that is stored in local temporary memory buffers on 600a to the memory region on node 600b using an RDMA write operation. The RDMA read module on node 600a reads data from remote memory regions C1:M1, C1:M2, C2:M1 located on node 600b to local temporary buffers C1:M1, C1:M2, C2:M1 located at the RTE layer 605a on node 600a using the RDMA read operation. In turn, the local write module on node 600b stores data received from node 600b's control application to local memory locations C1:M1, C1:M2, C2:M1 located on node 600b. The local read module on node 600b reads data stored in local memory locations C1:M1, C1:M2, C2:M1 at the ECU hardware layer 608b and makes it available to control applications on node B. The COM stacks resident on both nodes 600a-b represent AUTOSAR's communication stack (for non-RDMA related communications). The NICs 651a and 651b no longer use ROCE and instead include XCVRs available for sending and receiving data streams over the network connection 625, e.g. Ethernet or a version thereof. The NICs 651a and 651b include ports, such as the ingress and egress ports previously described.

It should be noted that, like in the above embodiments, diverse types of traffic may be implemented in parallel, with CT having the guaranteed bounded latencies. To accommodate whatever different traffic types are employed, multiple transmission selection algorithms may be employed. Examples of TSAs include strict priority algorithms, credit based traffic shapers, and time aware shapers.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented herein.

What is claimed is:

1. A vehicle, comprising:
a frame including a body, the body and frame defining a cabin and areas for placement of functional vehicle components; and
a network of electronic control units (ECUs) in the areas and selectively coupled together via conducting elements, at least some of the conducting elements coupled to respective switches for controlling data flow between identified ECUs of the plurality;
wherein the ECUs comprise respective network interface cards (NICs) having remote direct memory access (RDMA) hardware for generating messages, the NICs being further configured to execute traffic shapers to ensure that specified critical transmissions (CT) comprise lossless RDMA data exchanges characterized by bounded latencies.

2. The vehicle of claim 1, wherein the ECUs are configured to perform RDMA operations using one or more of a plurality of classes of data.

3. The vehicle of claim 2, wherein the plurality of classes of data include CT and best effort (BE) traffic.

4. The vehicle of claim 3, wherein the NICs further comprise ingress and egress ports, the ingress and egress ports having respective ingress and egress queues for each of the plurality of classes of data.

5. The vehicle of claim 1, wherein the NICs include at least one egress port, the egress port having the egress queues for transmitting the CT and the BE traffic.

6. The vehicle of claim 5, wherein respective switches comprise ingress and egress ports, each of the egress ports having the egress queues.

7. The vehicle of claim 6, wherein, for at least one of a plurality of transmission paths of the network:
the traffic shapers comprise asynchronous traffic shapers (ATSs);
a processing system in the NICs is operable to configure the egress queues of the corresponding NICs and the at least one switch in the at least one transmission path through which the CT flows to be managed by the ATSs;
the processing system is operable to configure the egress queues through which the BE traffic flows in the at least one transmission path of the plurality of transmission paths as strict priority without traffic shaping; and
the processing system is operable to calculate, for each egress queue in the at least one transmission path, a committed information rate (CIR) and a committed burst size (CBS), and to use the CIR and CBS with the asynchronous traffic shapers to guarantee the lossless RDMA operations and respective bounded latencies for the transmission path.

8. The vehicle of claim 7, wherein the processing system is further operable to:
configure the egress queues in the egress ports of the NICs for the plurality of transmission paths of the network through which the CT flows; and
determine each of the respective CIR and CBS values for each of the plurality of transmission paths to determine a bounded WCL.

9. The vehicle of claim 8, wherein the processing system is configured to determine the CIR and CBS values during initial system design.

10. A system, comprising:
a network comprising nodes, the nodes having respective network interface cards (NICs), at least some of the nodes being configured with remote direct access memory (RDMA), each NIC having an egress port, each of the egress ports having a plurality of egress queues, each of the egress queues corresponding to a class of traffic;
a processing system in the NICs to identify RDMA transmission paths which include a periodic flow of critical traffic (CT) across intervals;
for each of the RDMA transmission paths, the processing system is operable to:
identify all nodes from or through which the CT is transmitted;
configure, for each egress port, queues carrying the CT to be traffic-shaped to guarantee a lossless bounded latency for each successive interval; and
calculate committed information rate (CIR) and committed burst rate (CBR) values relevant to an egress port of a sink node in the transmission path to ensure a lossless, bounded-latency RDMA CT transmission at the sink node.

11. The system of claim 10, wherein the processing system is further operable to:
configure, for each egress port, any egress queues carrying lower priority data streams.

12. The system of claim 11, wherein the processing system is configured to calculate the worst case latencies (WCLs) of each frame of the RDMA CTs in each of the transmission paths to identify the bounded latency for the CT frame.

13. The system of claim 12, wherein the network further comprises switches having egress ports, each of the egress ports having egress queues.

14. The system of claim 13, wherein the processing system is configured to:
determine the WCLs for a periodic frame of CTs transmitted along all applicable transmission paths to the sink node based at least in part on a switch delay, a transmission size, a number of transmissions per interval, a long frame transmission time, and a maximum size frame of non-CT traffic preceding the frame of the CT; and identify a bounded WCL for the CT using the WCLs for the periodic frames sent to the sink node across each of the transmission paths.

15. The system of claim 10, wherein the network includes transmission of best effort (BE) traffic.

16. The system of claim 15, wherein the NICs includes at least one egress port, the egress port having at least two egress queues for transmitting the CT and the BE traffic, respectively.

17. A system for enabling an automotive software framework to support remote direct memory access (RDMA) communication, comprising:

a plurality of networked electronic control units (ECUs), each ECU comprising:

an application layer comprising a plurality of control algorithms;

an ECU hardware layer comprising a network interface card (NIC) and one or more microcontroller units (MCUs), wherein the NIC comprises one or more traffic shapers and a physical memory for sending an RDMA message to a second ECU, wherein the data is stored in the physical memory of the second ECU; and wherein the data is received at one of the control algorithms using an RDMA data channel on the second ECU, the RDMA data channel coupled respectively to the RDMA write and read modules on the second ECU.

18. The system of claim 17, where the ECUs are configured to guarantee a lossless bounded latency for a critical transmission (CT).

19. The system of claim 17, wherein the automotive software framework comprises AUTOSAR.

20. The system of claim 17, wherein the one or more traffic shapers eliminate a need for an RDMA over Converged Ethernet (ROCE) NIC protocol in the NICs of the ECUs.

* * * * *